United States Patent [19]

Bahr

[11] 4,173,607

[45] Nov. 6, 1979

[54] METHOD FOR TEXTURING THE SURFACE OF NON-WOVEN FABRIC FILMS

[75] Inventor: Karl E. Bahr, Meadville, Pa.

[73] Assignee: Textron Inc., Providence, R.I.

[21] Appl. No.: 805,175

[22] Filed: Jun. 9, 1977

[51] Int. Cl.² .................... H05B 5/00; H05B 9/00
[52] U.S. Cl. ................................ 264/25; 264/26;
      264/102; 264/284; 264/DIG. 46
[58] Field of Search .............. 264/25, 26, DIG. 46,
      264/284, 293, 101, 102

[56]         References Cited
       U.S. PATENT DOCUMENTS

| 2,393,541 | 1/1946 | Kohler | 264/25 |
| 2,783,175 | 2/1957 | Smith et al. | 264/284 |
| 2,970,345 | 2/1961 | Wangner, Jr. | 264/284 |
| 3,499,848 | 3/1970 | Weisman | 264/26 |
| 3,703,026 | 11/1972 | Uhrig | 264/284 |
| 3,791,906 | 2/1974 | Farkas | 264/26 |

*Primary Examiner*—Jeffery R. Thurlow
*Attorney, Agent, or Firm*—O'Brien and Marks

[57]            ABSTRACT

A non-woven fabric or film of thermoplastic material has a pattern impressed on its surface so that it has a more pleasing appearance. The film is pressed between the patterned surfaces of two mold bands and is passed through an electromagnetic field which heats a susceptor material in the film to soften the fabric or film so that the pattern will be impressed in it.

4 Claims, 3 Drawing Figures

METHOD FOR TEXTURING THE SURFACE OF NON-WOVEN FABRIC FILMS

BACKGROUND OF THE INVENTION

1. Field of the Invention

The present invention relates to methods and apparatus for fabricating non-woven fabrics and films and in particular for a method and apparatus for texturing the otherwise featureless smooth surface of such fabrics or films.

2. Description of the Prior Art

As far as is known, there is no prior art apparatus using an electromagnetic field to soften a thermoplastic strip so that it may be textured or patterned so as to have a more esthetically pleasing surface.

SUMMARY OF THE INVENTION

The present invention is summarized in that field apparatus for texturing the surface of a non-woven thermoplastic fabric or film sheet having a susceptor material therein includes a pair of endless mold bands at least one of which has a patterned surface formed thereon, drive means to drive the mold bands and to press the mold bands together for a portion of their length, the thermoplastic sheet being received between the mold bands where they are so pressed together, and electromagnetic energy generating means positioned so as to subject the thermoplastic sheet to an electromagnetic field to heat the susceptor material therein so that the thermoplastic sheet is impressed with the pattern on the patterned surface.

It is an object of the present invention to provide non-woven thermoplastic mounting tapes for slide fasteners that have textured or patterned surfaces so that they are esthetically pleasing in appearance.

It is another object of the present invention to form such textured or patterned surfaces rapidly and economically using as little energy as possible so as not to disrupt the structural integrity of the non-woven fabric or film.

It is yet another object of the present invention to provide an apparatus for forming the textured or patterned surface that is readily adaptable to many types of textures and patterns and to various types of non-woven fabric and films of various types and sizes.

Other objects, advantages and features of the present invention will become apparent from the following specification when taken in conjunction with the accompanying drawings.

DESCRIPTION OF THE PREFERRED EMBODIMENT

Figure 1:
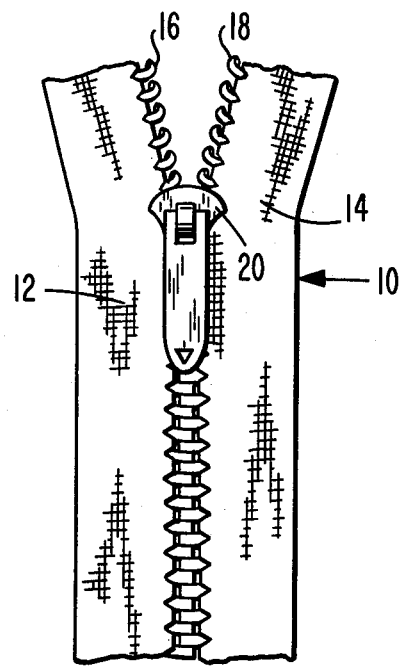
FIG. 1 is a front plan view of a slide fastener incorporating mounting tapes textured according to the present invention.

Shown in FIG. 1 is a slide fastener, generally indicated at 10, constructed utilizing therein a pair of non-woven tapes which have been textured or patterned according to the present invention. The slide fastener 10 includes a pair of mounting tapes 12 and 14, both of which are formed as non-woven strips of thermoplastic material and both of which have had their surfaces textured or patterned to resemble woven or knitted fabric by the method and apparatus of the present invention. These non-woven strips may be either simple extruded or cast films or may be non-woven fabric-like constructions in which grids of thermoplastic fibres are joined at intersections through the use of heat, adhesives, mechanical interlocks or the like. The mounting tapes 12 and 14 lie adjacent each other and each has a respective one of a pair of continuous trains of coupling elements 16 and 18 secured to its edge adjacent the other mounting tape. A slider 20 is entrained on the two trains of coupling elements 16 and 18 to move up and down them to successively engage and disengage the coupling elements from each other. The slider 20 is normally the last element added to the slide fastener 10, and the slide fastener 10 without the slider 20, that is with just the two mounting tapes 12 and 14 and the two trains of coupling elements 16 and 18 all interengaged with each other, is known as a slide fastener chain. In the manufacture of slide fasteners such as the slide fastener 10, a continuous slide fastener chain is cut into appropriate lengths and sliders 20 are mounted thereon to complete the slide fasteners.

Figure 2:
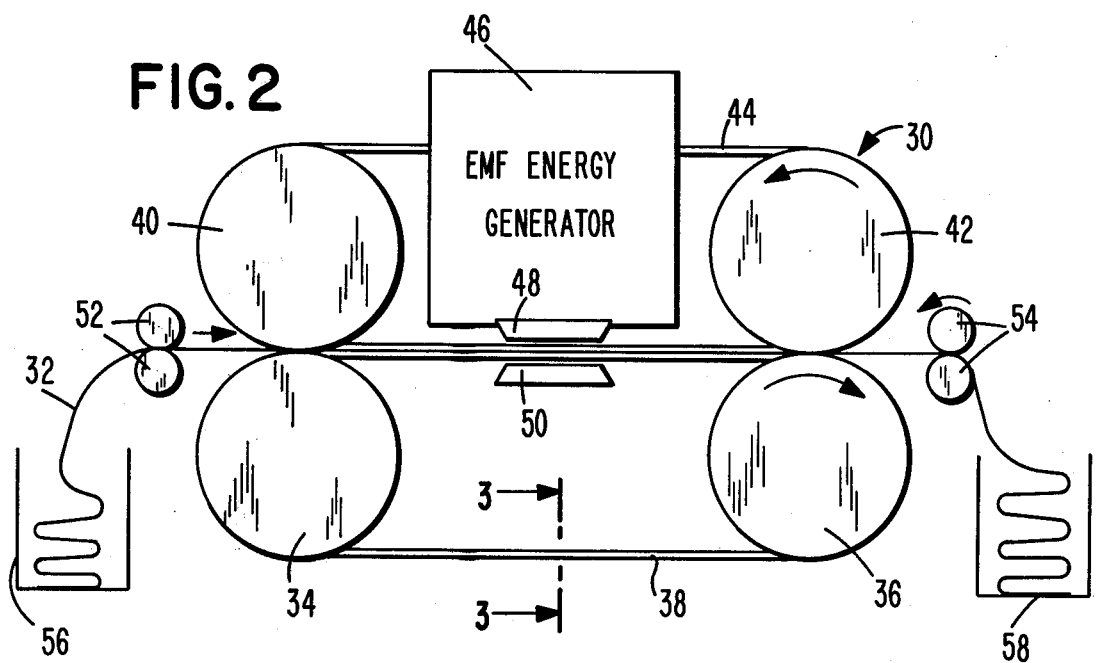
FIG. 2 is a side elevation view of an apparatus for texturing the mounting tapes of the slide fastener of FIG. 1.

Shown in FIG. 2 is an apparatus, indicated generally at 30, for texturing the surface of an indefinite length work sheet 32 of suitable non-woven fabric material having initially a smooth surface. The work sheet may be either of the mounting tapes 12 or 14 with or without the trains of coupling elements 16 and 18 thereon, or may be any other suitable non-woven fabric strip, but is preferably a slide fastener stringer including, as described above, both the mounting tapes 12 and 14 with the trains of coupling elements 16 and 18 secured thereon and with the coupling elements of the trains 16 and 18 all interengaged with the coupling elements on the other train. Before entering the apparatus 30, the tapes 12 and 14 of the work sheet 32 are smooth and featureless films or fabrics of thermoplastic sheet material having smooth surfaces with a susceptor material either applied as a coating on both sides thereof or intermixed into the thermoplastic films themselves. Suitable susceptor materials include vinyl applied as a coating for use in a dielectric energy field or iron filings used in an electromagnetic induction field, as will be explained below.

The apparatus 30 includes a first spaced pair of press wheels 34 and 36 which have entrained around them a first endless mold band 38. A second spaced pair of press wheels 40 and 42 have entrained about them a second endless mold band 44, the pairs of press wheels 34 and 36 and 40 and 42 and the mold bands 38 and 44 respectively being largely identical. The press wheels 34 and 40 are arranged adjacent each other as are the press wheels 36 and 42 so that the mold bands 38 and 44 are stretched tightly therebetween and firmly together for a portion of their length. An electromagnetic field (EMF) energy generator 46 is positioned around the mold band 44 and adjacent the portion of the mold bands 38 and 44 where they are pressed against each other. The EMF energy generator may be a source of either a radio frequency energy field or an electromagnetic induction field depending on the susceptor material in the work sheet 32. A pair of electrodes 48 and 50 of the EMF energy generator 46 are positioned on opposite sides of the pressed together mold bands 38 and 44. First and second sets of guide wheels 52 and 54 are provided at opposite ends of the apparatus 30 and receive the work sheet 32 therebetween. A supply reservoir 56 is provided to hold the work sheet 32 before the texturing operation and a receiving reservoir 58 is provided to receive the treated work sheet 32.

Figure 3:
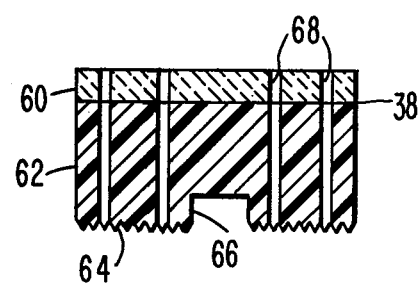
FIG. 3 is a cross-section along the line 3—3 in FIG. 2.

A cross section of the mold band 38 is shown in FIG. 3. The mold band 38 includes a support belt 60 formed of a material having a high resistance to elongation such as woven glass. Formed onto the support belt 60 is a shaping layer 62 of silicone or other suitable resilient material molded onto the support belt 60. The materials of both the support belt 60 and the shaping layer 62 are selected so as to be nonsusceptible in that they are relatively unaffected by the imposition of electromagnetic energy fields. The shaping layer 62 has a patterned surface 64 formed all along its exterior face and has a longitudinally extending channel 66 formed in it opening into the center of the patterned surface 64. A plurality of vent holes 68 are provided in the mold band 38 extending through both the shaping layer 62 and the support belt 60. The mold band 44 is largely identical to the mold band 38 although the pattern of the patterned surface 62 may be varied if so desired.

In the operation of the apparatus 30 of FIG. 2, the press wheels 34 and 36 are driven to rotate in a clockwise direction while the press wheels 40 and 42 are driven in a counterclockwise direction to move the pressed-together portions of the mold bands 38 and 44 in a left-to-right direction as viewed in FIG. 2. The work sheet 32 is withdrawn by the moving mold bands from the supply reservoir and through the guide wheels 52 and 54. Once in between the mold bands 38 and 44 the work strip 32 is held in place between the two shaping layers 62 with the patterned surfaces 64 contacting the work sheet 32. When the work sheet 32 is the slide fastener stringer the two tapes 12 and 14 are held between the patterned surfaces 64 while the interengaged trains of coupling elements 16 and 18 are received in the channel 66 so that they will not be deformed. The mold bands 38 and 44 carry the work sheet 32 between the electrodes 48 and 50 so that the work sheet is subjected to an electromagnetic energy field created by the EMF energy generator 46. The susceptor material in the work sheet 32 is heated by the electromagnetic field, the heat being transferred to the surface of the thermoplastic material of the work sheet 32 to soften it. In its softened condition, the work sheet 32 is then impressed with the patterns of the patterned surfaces 64. The work sheet 32 then leaves the mold bands 38 and 44 and hardens with the patterns impressed on the surfaces of the mounting tapes 12 and 14. The work sheet 32 is guided by guide wheels 54 into the receiving reservoir.

As stated above, the EMF energy generator may be either a radio frequency energy generator or an electromagnetic induction field generator. For a work strip having a dielectric susceptor material, such as a vinyl coating on the outside of the sheet, a radio frequency device is used and the susceptor material is heated due to dielectric losses in the susceptor material. If an electromagnetic induction field generator is used, the susceptor material should be ferromagnetic, such as iron filings imbedded in the work sheet 32 itself, and these susceptor materials would heat the work strip because of the hysteresis losses which would be created in the ferromagnetic material by the alternating induction field.

The pattern created on the mounting tapes 12 and 14 can be any desired pattern, but the invention is particularly useful for creating a simulation of either a knitted or woven appearance. This pattern on the mounting tapes 12 and 14 would obviate one of the major objections to the use of thermoplastic films, the shiny or slick appearance of the untreated film. Thus by using the present invention it is possible to obtain the desirable cost advantages of thermoplastic films while still overcoming one of the more objectionable characteristics of such films, their shiny appearance.

Furthermore, in the fabrication of these non-woven fabrics or films, oriented fabric or films are often used to strengthen the material in particular directions. The present invention is particularly adapted for use with such oriented fabrics or films since the heating effect of the EMF field can be concentrated in specific areas of the sheet material, such as just on its outer surfaces, and thus would have minimal effect on the oriented material which would be greatly disturbed by a more thorough heating process.

If desired any additional decorative steps may be added to the work sheet produced by the present invention. For instance, the raised portions of the pattern produced may be selectively colored by contact coating or may be coated with adhesive to accept flocking material for a further decorative effect.

Inasmuch as the present invention is subject to many modifications, variations, and changes in detail, it is intended that all the subject matter contained in the aforegoing specification or in the accompanying drawings be interpreted as illustrative, and not in a limiting sense.

What is claimed is:

1. A method of manufacturing a textured strip of slide fastener chain comprising the steps of
    forming a slide fastener chain including a pair of mounting tapes and a pair of interengaged trains of coupling elements secured on inner edges of the respective tapes, each tape being a smooth film strip of the thermoplastic material which includes a susceptor material,
    running the slide fastener chain between parallel sections of a pair of endless nonsusceptible mold bands supported by respective pairs of spaced press wheels rotating the pair of mold bands,
    compressively engaging the pair of tapes during the running step by means of facing resilient patterned surfaces of the respective endless mold bands,
    passing the strip through an electromagnetic field during an intermediate portion of said compressively engaging step to soften the thermoplastic material of the tapes,
    venting air between the resilient patterned surfaces and the strip by means of spaced openings through said endless bands during said passing step,
    whereby the tapes of the strip are impressed with a pattern from the patterned surfaces, and
    receiving the pair of interengaged trains of coupling elements within longitudinal channels formed in the centers of the respective patterned surfaces so that the pair of interengaged trains of coupling elements remained undeformed.

2. A method as claimed in claim 1 wherein the electromagnetic field is a radio frequency field.

3. A method as claimed in claim 1 wherein the electromagnetic field is an electromagnetic induction field.

4. A method as claimed in claim 1 wherein the tapes of smooth film thermoplastic material including a susceptor material are made by the steps of making a thermoplastic film and coating the thermoplastic film with a susceptor material.

* * * * *